United States Patent [19]
Larocque

[11] 3,936,973
[45] Feb. 10, 1976

[54] ANIMAL TRAP

[76] Inventor: Walter Larocque, General Delivery, Swan River, Manitoba, Canada

[22] Filed: Nov. 18, 1974

[21] Appl. No.: 524,463

[52] U.S. Cl. .............................................. 43/81
[51] Int. Cl.² ................................. A01M 23/30
[58] Field of Search .............................. 43/81, 82

[56] References Cited
UNITED STATES PATENTS

| | | | |
|---|---|---|---|
| 462,343 | 11/1891 | Wells, Jr. | 43/81 |
| 612,866 | 10/1898 | Nelson | 43/81 |
| 1,592,155 | 7/1926 | Redford | 43/82 |

Primary Examiner—Hugh R. Chamblee
Assistant Examiner—Daniel J. Leach
Attorney, Agent, or Firm—Stanley G. Ade

[57] ABSTRACT

An animal trap comprising a pair of open frame rectangular sections hinged together by one side thereof and having a heavy duty spring normally biassing the frames towards one another. A trigger and bait holder or assembly is provided to hold the frames apart in the set position and includes a first member pivoted by one end thereof to one of the frames and engaging a cross bar of the other frame by the other end thereof. A second member is pivoted to the other end and extends upwardly between the open frames and bait may be impaled on the distal end. The other end by which it is pivotally secured to the first member, projects downwardly and also engages the cross bar so that if the second member is pivoted or moved slightly by an animal attempting to remove the bait, the first member is rocked clear of the bar thus allowing the trap to be sprung. A cover can be incorporated which covers the trap and the animal when the trap is sprung, thus protecting the pelt.

4 Claims, 2 Drawing Figures

ANIMAL TRAP

BACKGROUND OF THE INVENTION

This invention relates to new and useful improvements in animal traps. For some considerable time there has been considerable experimentation carried out in order to produce an animal trap which is humane in operation yet which at the same time is economical enough for the average trapper to be able to purchase same.

Conventionally, animal traps utilize serrated jaws or snare-type loops. The serrated jaws while very efficient insofar as catching an animal is concerned, nevertheless often catch the animal by the foot and certainly cannot be considered to be humane. Furthermore, the serrated jaws often damage the pelt.

Snare-type traps while very efficient, have to be placed carefully in position so that the animal runs into the snare and, of course, snare-type traps are extremely difficult to bait in order to attract the animal to the snare.

SUMMARY OF THE INVENTION

The present invention overcomes these disadvantages by providing a spring-type trap which not only is humane, but also may be baited readily and easily.

The principal object and essence of the invention is therefore to provide a spring-type trap which eliminates serrated jaws and which furthermore is provided with means to hold bait which, when disturbed, springs the trap. This means that the animal's head is fully within or between the jaws in order to get at the bait so that the trap closes on the neck of the animal thus killing the animal rapidly and humanely.

Still another object of the invention is to provide a device of the character herewithin described which may incorporate a cover which covers the trap and animal when sprung thus protecting the pelt from the weather.

Still another object of the invention is to provide a device of the character herewithin described which is simple in construction, economical in manufacture and otherwise well suited to the purpose for which it is designed.

With the foregoing objects in view, and other such objects and advantages as will become apparent to those skilled in the art to which this invention relates as this specification proceeds, my invention consists essentially in the arrangement and construction of parts all as hereinafter more particularly described, reference being had to the accompanying drawings in which:

BRIEF DESCRIPTION OF THE DRAWINGS

In the drawings like characters of reference indicate corresponding parts in the different figures.

DETAILED DESCRIPTION

Figure 1:
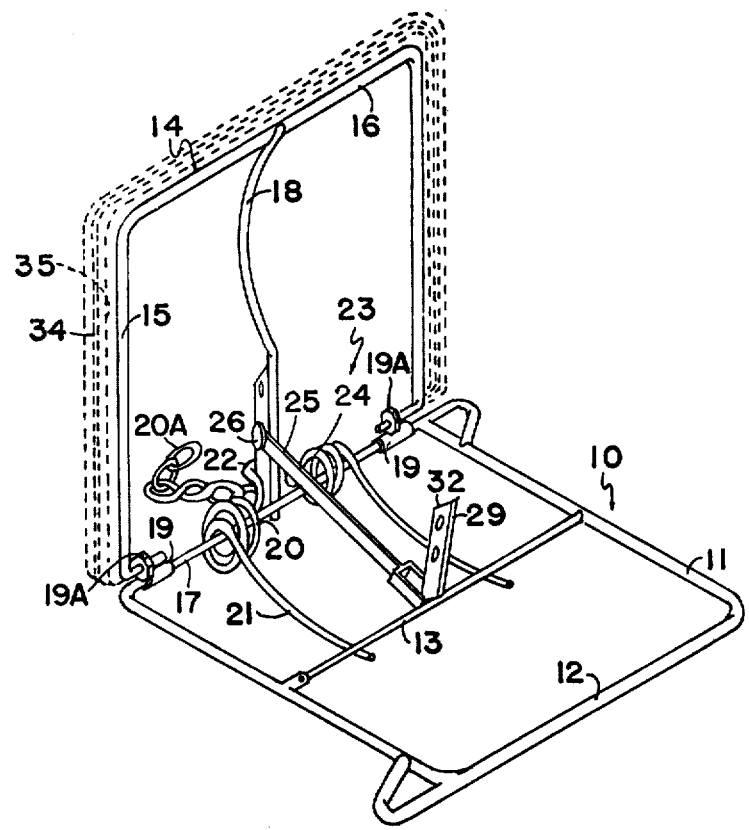
FIG. 1 is an isometric view of the trap shown in the trap set position.

Proceeding therefore to describe the invention in detail, the trap consists of a substantially rectangular base frame 10 having a pair of spaced and parallel side members 11, and end member 12 and a cross bar 13 extending between the side members 11 substantially intermediate the ends thereof. An inner member 17 extends between the inner ends of the side members 11 thus making a substantially rectangular frame configuration.

A movable frame collectively designated 14 is also provided having an external configuration substantially similar to the configuration of the base frame 10. This frame 14 consists of side members 15 together with an end member 16. A cross bar 18 is also provided, but in this frame it is secured to intermediate the ends of front member 16 and the other end rests behind member 17 of the other frame, when the two frames are assembled as follows:

Cylindrical portions 19 engage around the inner member 17 of the base frame adjacent the outer ends thereof and apertured washers 19A are welded or otherwise secured to these portions 19. The inner ends of the side members 15 of the movable frame are inturned and pivotally engaged within these washers 19A as clearly shown, thus hingingly connecting the movable frame to the base frame by the common longitudinal member 17 and the washers 19A secured to the cylindrical portions 19.

The dimensions of the two frames is such that when the movable member 14 folds downwardly over the base member 10, they are substantially in interfacial relationship one with the other.

Heavy duty coil springs 20 are provided around the inner member 17 of the movable frame 14 and extending ends 21 of these coil springs engage under the cross bar 13 of the base member 10. The other ends 22 of the springs engage behind the cross bar 18 of the movable member and hold the bar 18 against member 17 and normally urge the movable member towards the fixed member. If desired, the ends 22 of the two coil spring sections 20 illustrated, may be joined together behind the cross bar 18.

A combination trigger and bait holding assembly 23 is provided to hold the trap in the trap set position illustrated in FIG. 1 against the pressure of spring 20. This assembly includes a first member 24 pivoted by one end 25 thereof to an offstanding pin 26 on the cross member 18 of the movable frame 14. The other end 27 of the first member 24 is concavedly curved as shown at 28 to engage the cross bar 13 of the base frame 10, as shown in FIG. 2.

Figure 2:
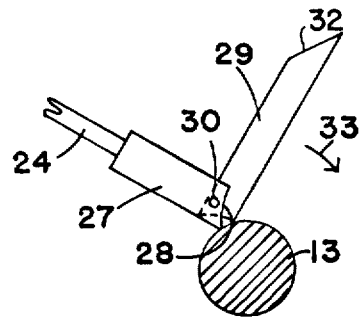
FIG. 2 is an enlarged cross sectional view showing the engagement of the bait and trigger assembly with the cross bar.

The second member 29 constitutes the bait holding portion of the assembly and is pivoted to adjacent the end 27 of the first member by means of pivot pin 30 and it will be observed from FIG. 2 that the extremity 31 of the second member 29 extends beyond the concave end 28 of the first member 24 and also engages the surface of the cross member 13. When in the set position shown in FIG. 1, this second member 29 extends upwardly within the angle formed by the two frames 10 and 14 when in the trap set position.

The other end of the second member 29 is provided with a pointed end 32 or the like upon which may be impaled bait to attract the animal to be trapped.

When in the set position shown in FIG. 1, it will be appreciated that any pulling movement on the second member 29, particularly in the direction of arrow 33, will disengage the end 28 of the second member from the cross member 13 due to the leverage relationship between the assembly and the member 13 clearly illustrated in FIG. 2.

This enables the springs 20 to snap the movable member downwardly towards the base member 10 to the trap sprung position thus striking the animal across the back of the neck and killing it instantly. A chain 20A is secured by one end thereof to member 17 and may be used to anchor the trap to a fixed location if desired.

A light wire frame 34 is shown in phantom extending upwardly and behind the movable frame 14 and it is secured to the frame 14 by means such as hog rings or the like (not illustrated). A light cloth cover 35 is secured to this wire frame 34 and of course closes with the trap, thus covering the trap and the animal and protecting the pelt from weather damage or from being attacked by other animals.

Finally it should be noted that although the trigger and bait holding assembly is illustrated and described as being pivotally secured to the movable frame 14 and detachably engageable with the base frame 10, nevertheless these positions could be reversed if desired with the first member 24 being pivoted to cross member 13 of the base frame 10 and the bait holding portion 29 and the distal end of the first member 24 engaging a similar cross member (not shown) spanning the movable frame 14.

Since various modifications can be made in my invention as hereinabove described, and many apparently widely different embodiments of same made within the spirit and scope of the claims without departing from such spirit and scope, it is intended that all matter contained in the accompanying specification shall be interpreted as illustrative only and not in a limiting sense.

What I claim as my invention is:

1. An animal trap comprising in combination a base frame section and a movable section hingedly secured by one side thereof to one side of said base section, spring means co-operating between said sections normally urging said sections towards one another to a trap sprung position and a combination trigger and bait holding assembly operatively connected between said sections to releasably hold said movable section at an angle from said base section in a trap set position against the pressure of said spring means, said trigger and bait holding assembly including a first member pivotally secured by one end thereof to one of said sections and being detachably engageable with the other of said sections to hold said sections in the trap set position, and a second member pivotally secured by adjacent one end thereof to adjacent the other end of said first member and engaging said other of said sections by said one end thereof whereby said other end of said second member extends within the angle formed by said sections when in the trap set position and bait holding means on said other end of said second member, said second member co-operating with said first member and said other section to release said first member from said other section when said other end of said second member is moved a pre-determined amount.

2. The trap according to claim 1 in which said sections are substantially rectangular and are hingedly secured together by common longitudinal edges thereof.

3. The trap according to claim 1 in which said base frame includes a trigger assembly engaging bar spanning said base frame, said other end of said first member being shaped to detachably engage said bar when said frames are in the trap set position, said one end of said second member having a projecting portion engaging said bar whereby movement of said second member disengages said other end of said first member from said bar.

4. The trap according to claim 2 in which said base frame includes a trigger assembly engaging bar spanning said base frame, said other end of said first member being shaped to detachably engage said bar when said frames are in the trap set position, said one end of said second member having a projecting portion engaging said bar whereby movement of said second member disengages said other end of said first member from said bar.

* * * * *